United States Patent Office 3,709,788
Patented Jan. 9, 1973

3,709,788
BLEACHED STARCH COMPOSITION OF IM-
PROVED ENZYME CONVERTIBILITY AND
PROCESS FOR USE THEREOF
Roland W. Best, Raymond A. Doughty, and Leonard F.
Vander Burgh, Decatur, Ill., assignors to A. E. Staley
Manufacturing Company, Decatur, Ill.
No Drawing. Filed Mar. 19, 1970, Ser. No. 21,519
Int. Cl. C12b 1/00
U.S. Cl. 195—31 R                          22 Claims

ABSTRACT OF THE DISCLOSURE

An improved enzyme convertible starch composition comprising bleached starch, calcium compound and sulfite salt or precursor. When mixed with water and alpha-amylase, and maintained between about 160° F. and 195° F. and between 6.0 and 7.5 pH, composition yields an improved starch conversion product.

---

The present invention relates to improvements in the enzyme conversion of starch. More particularly, it relates to starch compositions having improved alpha-amylase convertibility and to a process for using the starch composition.

The thinning of starch with alpha-amylase is widely used to reduce starch viscosity without employing highly modified, and therefore expensive starch. Using starch that has been bleached is known to give valuable and even superior conversion products. These products are useful, for example, as adhesives and coatings in the manufacture of paper and textile products. Bleaching the starch is required in certain application to improve the color and reduce the protein content of the starch. There are, however, several disadvantages which accompany the use of alpha-amylase to convert bleached starches for these and other applications. The cost of the enzyme required is one such disadvantage. Coupled with this disadvantage is the fact that if the cost of the enzyme is to be minimized, the time required for conversion of the starch is lengthened appreciably. Also, alpha-amylase conversions of bleached starches have been difficult to control and, therefore, often do not yield uniform conversion products. These latter problems are accentuated in that much of the commercial practice of alpha-amylase starch conversion is carried out at the site of actual product usage under conditions that permit only a minimum of process control. This situation, in turn, can and does lead to unsatisfactory alpha-amylase conversion products of starch. Because of these and other process disadvantages the use of alpha-amylase to convert bleached starches into useful hydrolyzates has not achieved its full potential.

Accordingly, it is the primary object of the present invention to provide compositions of bleached starch that show improved convertibility when treated with alpha-amylase.

Another object of the present invention is to provide bleached starch compositions which are easily and rapidly converted by the action of alpha-amylase to yield uniform and satisfactory products.

An additional object of the present invention is to provide bleached starch compositions which can be efficiently converted by the action of alpha-amylase with a minimum of process control.

A still further object of the present invention is to provide an alpha-amylase convertible, bleached starch in a form that can be used efficiently and effectively to yield starch conversion proudcts at the site of usage of these products and to provide a method of using such starch. Other objects and advantages of this invention will become apparent hereinafter.

Calcium compounds have been used to aid the hydrolysis of starch by alpha-amylase, particularly alpha-amylase from *Bacillus subtilis*. Although the exact mechanism is unknown, the presence of calcium ion during the starch conversion increases and stabilizes the activity of the enzyme. Also, the alpha-amylase conversion of starch is dependent on the pH of the reaction environment, with the optimum pH normally being within the range of 6.0 to 7.5. Therefore, in order to activate and stabilize the alpha-amylase and, at the same time, obtain the proper initial pH, alkaline calcium compounds, such as calcium oxide and calcium hydroxide, are added to the starch prior to enzyme conversion. However, starch converted in the presence only of calcium compounds often does not yield a satisfactory product. One reason for this is the fact that, as the alpha-amylase conversion proceeds, the pH of the reaction system becomes markedly acidic. This pH shift occurs in bleached as well as unbleached starches and can be so severe as to cause partial, and even substantial, deactivation of the alpha-amylase. This, in turn, leads to unacceptable hydrolysis products and added expense for enzyme.

The answer to the above problem would appear to be a simple buffer system. However, a great many buffering systems have been tried without much success. Many of the buffers have proven to be incompatible with the calcium compounds used and/or are not operable to maintain the starch within the optimal pH range.

We have discovered that these problems are surprisingly overcome by using a sulfite-bisulfite buffering system in combination with calcium compounds to improve the alpha-amylase convertibility of bleached starch.

Our invention comprises a bleached-starch composition, in which the major proportion is bleached starch hydrolyzable in an aqueous medium by alpha-amylase. The bleached starch compositions of the present invention include an amount of calcium compounds sufficient to activate and stabilize the alpha-amylase to a predetermined extent, i.e., the action of alpha-amylase is promoted sufficiently so that a product of predetermined viscosity is obtained in a predetermined period of time by the action of a given amount of alpha-amylase. The third essential ingredient of the bleached starch compositions of the present invention is a salt or combination of salts which yields sulfite and/or bisulfite ions upon solution in an aqueous medium. This salt (or combination of salts) is present in the bleached starch composition in an amount sufficient to maintain the pH within the range of from 6.0 to 7.5 in an aqueous paste of about 11% by weight of dry substance starch composition, when the paste is alpha-amylase converted at 175° F.

Starch is normally mildly acid in aqueous slurry. When starch is bleached, the bleaching usually produces additional acidity. Accordingly, because of prior processing conditions, a cold water slurry of bleached starch is acidic in pH (around 5.0–5.5). Since the starch paste in which alpha-amylase hydrolyzes bleached starch is optimally maintained at a pH within the range of 6.0 and 7.5, a certain amount of alkalinity is needed to provide an initial pH within this range. Calcium oxide or calcium hydroxide can be used to provide this alkalinity, as well as to provide the calcium ion needed to activate and stabilize the alpha-amylase. A mixture of calcium compounds can be used to give the proper amount of alkalinity and sufficient calcium ion to promote the action of the alpha-amylase. Such a mixture can be made up of calcium oxide and/or calcium hydroxide and other calcium compounds. It is also possible to use other alkaline compounds, such as sodium or other alkali metal hydroxides and the like, in combination with calcium oxide and/or calcium hydroxide to provide the necessary alkali. Additional calcium, if needed to activate and stabilize the alpha-amylase can be provided by the addition of any non-alkaline calcium compound, e.g., calcium carbonate, calcium chloride, calcium sulfate, calcium acetate, and the like water-soluble or slightly soluble compounds or salts.

Another component of the composition of this invention is a salt that yields sulfite or bisulfite ion in aqueous solution. Because an equilibrium is set up in aqueous solution between sulfite and bisulfite ions, it is possible to use a single salt, which yields either sulfite or bisulfite ions, as a component of the compositions of the present invention. It is apparently this equilibrium which makes the sulfite-bisulfite combination an effective buffer within the pH range of 6.0 to 7.5. However, if a single salt is used which yields the acidic bisulfite ion in aqueous solution, relatively large amounts of calcium oxide and/or calcium hydroxide are required so that the aqueous paste of bleached starch and alpha-amylase has an initial pH within the optimal range of 6.0 to 7.5. The amount of calcium ion may be so large as to cause difficulty in deactivating the enzyme rapidly enough after the conversion. This deactivation problem, in turn, can result in an overly degraded starch conversion product.

One way to avoid this problem is to use alkaline compounds with cations other than calcium to adjust the initial pH of the starch paste to within the optimal range. Another solution is to use a combination or mixture of sulfite and bisulfite ion-yielding salts, so that the amount of calcium oxide and/or hydroxide needed to adjust the initial pH of the aqueous starch paste to within the optimal range does not yield calcium ion in excess of that needed.

We believe that, aside from acting as an integral part of the buffering system, the bisulfite ion present in the starch paste during alpha-amylase conversion performs another more important function which aids the action of the alpha-amylase. The exact nature of this bisulfite ion function is not known. Although we do not wish to be limited by any theoretical considerations, we believe the discussion below is a logical explanation of this unknown bisulfite ion function, and present it here solely as an aid to understanding the scope of the invention.

Bleach starch is known to include a certain concentration of carbonyl groups as a result of the bleaching process. These carbonyl groups are thought to interact with the active sites of the alpha-amylase, thus causing the enzyme to be less efficient in converting the bleached starch. The bisulfite ions which are present in the starch paste during conversion are thought to react with these starch carbonyl groups to form an addition product, or to reduce the carbonyl group, thus freeing the alpha-amylase for a more efficient and easily controlled starch conversion.

This theory is consistent with the following observations. The sulfite-bisulfite buffer system is effective only with bleached or oxidized starch which contains carbonyl groups. The use of the sulfite-bisulfite buffer system, relative to using other buffers permits the use of less alpha-amylase and/or shorter conversion cycles to yield a bleached starch conversion product. Also, a satisfactory starch hydrolyzate results when a bleached starch, which is known to yield an unsatisfactory product when treated with alpha-amylase using a buffer other than sulfite-bisulfite, is combined with the sulfite-bisulfite buffer system and treated with alpha-amylase. In addition, thiosulfate salts, which are reducing agents, are suitable for use in this invention.

Because this additional amylase-stimulating function of the bisulfite ion is valuable independently of the buffering function of the sulfite-bisulfite buffer system, it is possible to use other buffer systems, for example, the alkali metal orthophosphate system of copending application, Ser. No. 777,140, now U.S. Pat. No. 3,616,219 to maintain the pH of the starch paste during conversion within the optimal range. The bleached starch compositions then include sufficient bisulfite ion-producing salt so that the bisulfite ion can perform its non-buffering function to enable the alpha-amylase to act properly, by reaction with carbonyl or by whatever mechanism this amylase-stimulating function is accomplished. Note that, since sulfite ions equilibrate with the bisulfite ions, bisulfite ion-producing salt may be a salt which initially yields sulfite ions in aqueous solution. Therefore, the present nvention specifically includes a bleached starch composition of improved alpha-amylase convertibility which comprises a mixture of a major proportion of bleached starch, hydrolyzable by alpha-amylase, an amount of calcium compound sufficient to activate and stabilize the alpha-amylase, an amount of buffering agent sufficient to maintain the pH within the range of from 6.0 to 7.5 in an aqueous paste of about 11% by weight of dry substance starch composition when the paste is alpha-amylase converted at 175° F., and an amount of bisulfite ion-producing salt or salts such that the bisulfite ions produced suppress the activity-lowering effect of the bleached starch on the alpha-amylase.

The bleached starch compositions of the present invention may be prepared in any convenient manner which gives a uniform mixture of the essential ingredients. Normally, these ingredients are dry mixed in rotary mixers, double-cone blenders, ribbon blenders and the like.

In each specific embodiment of the invention the actual make-up of the bleached starch composition depends on many factors. Among these factors or variables are: the extent to which the starch component is bleached; the cold water slurry pH of the starch component; the molecular weight of the starch component and the extent of hydrolysis desired; and the properties of the particular enzyme that is employed. The starch component dry substance, of course, is present in the compositions of the present invention in major proportion, normally at least 97% by weight, relative to the other essential ingredients. The starch compositions of the present invention are normally made up using bleached starch which includes between 5% and 15% moisture.

The starch component of the enzyme convertible starch compositions of the present invention suitably may be any bleached starch material capable of being hydrolyzed by alpha-amylase. The bleached starch material can be those derived from unmodified starch from corn, wheat, rice, potatoes, tapioca, and the like vegetable sources. The bleached starch material is obtained by treating the unmodified starch with conventional bleaching or oxidizing agents such as calcium or sodium hypochlorite, sodium or potassium permanganate, periodic acid, sodium peroxide, hydrogen peroxide and the like. Due to economic considerations and processing simplicity, hypochlorite treatment is the preferred starch bleaching process. Also included among the bleached starch material usable in the present invention are starch ethers or esters obtained by reacting the starch material described above, before or after bleaching, with an appropriate etherifying or esterifying agent such as propylene oxide to yield hydroxypropyl starch, or acetic acid anhydride to yield acetylated starch. A preferred class of bleached starch material, because of its bulk availability and inexpensive cost, is bleached corn starch derived by treating unmodified corn starch with a conventional bleaching agent, especially chlorine as sodium or calcium hypochlorite.

The salt or salts that provide the sulfite-bisulfite buffering system may be any salt capable of yielding sulfite or bisulfite ions in an aqueous solution. Salts, such as sodium thiosulfate and potassium thiosulfate, which yield sulfite or bisulfite ions in aqueous solution only after oxidation are included in this class of compounds and are suitable for use in our invention. Additional specific examples of suitable salts are ammonium sulfite, ammonium bisulfite, sodium sulfite, sodium bisulfite, sodim meta-bisulfite, potassium sulfite, potassium bisulfite, calcium dihydrogen sulfite and the like. Because of the low cost and ready availability, the preferred class of salts for use in the present invention consists of sodium sulfite, sodium bisulfite and sodium meta-bisulfite. Based on an alpha-amylase containing paste of about 11% by weight of the dry bleached starch composition and 89% by weight of water, the addition of as little as 0.05% based on the weight of the dry bleached starch component, of the sulfite-bisulfite buffer producing salts to the starch composition can improve the performance of the alpha-amylase. Since no real advantage is gained by having excess buffer in the starch compositions, the concentration of sulfite-bisulfite buffer producing salts is seldom more than 2.0% based on the dry substance weight of the bleached starch component. The preferred concentration of these salts in the starch composition of the present invention is 0.1% to 1.2% based on the dry substance weight of the bleached starch component.

The calcium component of the starch compositions of the invention is used to activate and stabilize the alpha-amylase during the starch hydrolysis. This calcium component may be any inorganic or organic calicum compound, or mixture of such compounds. Specific examples of suitable forms of calcium include calcium oxide, calcium hydroxide, calcium carbonate, calcium phosphates, calcium citrate, calcium lactate, calcium oxalate, calcium tartrate and the like. Due to the ready availability and low cost, calcium oxide and calcium hydroxide are the preferred compounds if the calcium compound is used to control the initial pH within the optimal range of 6.0 to 7.5. If the alkalinity of the oxide or hydroxide is not required, calcium chloride is the preferred compound to activate and stabilize the alpha-amylase.

Under typical alpha-amylase conversion conditions, at least about 0.005%, and more preferably at least about 0.05% of the calcium compound, based on the dry substance weight of the bleached starch component is sufficient to provide the desired activation and stabilization of the alpha-amylase. However, if excess calcium ion is present in the starch paste along with the alpha-amylase, it will be difficult to deactivate the enzyme so as to prevent hydrolysis of the starch beyond the desired level, i.e., to control the end-point of the conversion. Also, excess calcium component has no effect on the useful enzyme activity. For these reasons, the amount of calcium component should not exceed 1.0% of the dry weight of the bleached starch component.

The starch composition of the present invention is used in the conventional manner to produce alpha-amylase converted starch products. Using conventional equipment, the starch compositions are pasted in water and the pastes are treated with alpha-amylase which acts to catalyze the hydrolysis of the starch. Therefore, the only additional ingredients that need be added to the bleached starch compositions of the present invention to produce useful hydrolyzates are alpha-amylase and water. These bleached starch compositions, for example, are typically pasted in water at a concentration in the range from about 5% to about 40% by weight, dry substance basis, and then hydrolyzed at a temperature in the range of from about 160° F. to about 195° F. with an alpha-amylase preparation from a microbial source, e.g., bacteria such as *Bacillus subtilis* or fungi such as *Aspergillus niger*. The enzyme is deactivated in any conventional manner, for example, by heating the starch paste to about 210° F. for 15 minutes.

The invention having been described in detail, the following examples are provided to show specific embodiments of the compositions and processes thereof. It will be understood the examples are given for illustration purposes only and not by way of limitation.

EXAMPLE I

A mixture was formed by dry blending the following ingredients, in the indicated proportions:

|  | Parts, dry substance weight basis |
|---|---|
| Bleached (with sodium hypochloride) unmodified corn starch | 100 |
| Sodium metabisulfite | 0.6 |
| Sodium sulfite | 0.2 |
| Calcium hydroxide | 0.1 |

Water was added to about 43 grams of this dry mixture to form a slurry having a total weight of 400 grams. This slurry had a pH of 6.9. About 0.4 cc. of a 1% aqueous solution of a commercial alpha-amylase preparation (Vanzyme 31, Vanderbilt Chemical Co.) was added to the slurry.

The slurry was heated in a water bath above the paste temperature to 175° F. The paste was maintained at this temperature for 20 minutes to allow the starch hydrolysis reaction to proceed. The enzyme was deactivated by rapidly heating the paste to 210° F. and holding it at that temperature for 15 minutes.

Sufficient water was added to the paste to compensate for evaporation losses and bring the total weight of the paste back to 400 grams. The paste was cooled to 150° F. The pH of the cooled liquid was about 6.7 and the viscosity was found to be 22 cps. The viscosity was measured on a Brookfield Viscometer Model RVT using a No. 1 spindle at 20 r.p.m.

EXAMPLE II

This example illustrates the unsatisfactory enzyme conversion product obtained from bleached starch when no sulfite or bisulfite ion producing salts are added.

Example I was repeated except that no sodium metabisulfite or sodium sulfite is added. The pH of the slurry prior to addition of the enzyme was 6.7. After the enzyme had been deactivated and the starch paste cooled to 150° F., the pH of the converted paste was 4.9, and its viscosity, measured as above, was 12,500 cps.

A duplicate conversion was run, except that the dry starch mixture included 0.8 part, by weight, of a 50:50 sodium metabisulfite-sodium sulfite mixture. The pH of the slurry prior to addition of the enzyme was 6.7. After the enzyme had been deactivated and the starch paste cooled to 150° F., the pH of the converted paste was 6.3, and its viscosity, measured as above, was 28 cps.

EXAMPLES III AND IV

Examples 3 and 4 illustrate the fact that the sulfite-bisulfite system has little or no effect in improving the quality of enzyme converted products produced from unbleached starches.

The following dry mixtures were prepared:

|  | Parts, dry substance weight basis | |
|---|---|---|
|  | Example 3 | Example 4 |
| Unbleached corn starch | 100 | 100 |
| Sodium metabisulfite | 0.4 |  |
| Sodium sulfite | 0.4 |  |
| Calcium hydroxide | 0.1 | 0.1 |

Each of these mixtures was enzyme converted following the procedure of Example I. The results of these conversions are as follows:

|  | Example 3 | Example 4 |
|---|---|---|
| Slurry pH prior to addition of enzyme | 6.8 | 6.7 |
| Converted paste pH (at 150° F.) | 6.1 | 6.1 |
| Viscosity of converted paste, cps | 42 | 38 |

The enzyme conversions resulted in identical products (within experimental error) whether the sulfite-bisulfite system was present or not.

EXAMPLE V

This example illustrates that sodium thiosulfate can be used to obtain a satisfactory enzyme conversion product from bleached starch. Example I was repeated except that 0.1 parts of sodium thiosulfate replaced the mixture of sodium metabisulfite and sodium sulfite, and dilute hydrochloric acid was used to adjust the slurry pH to 6.8. The pH of the cooled liquid was about 6.9 and the viscosity was found to be 33 cps.

Further embodiments of this invention which do not depart from the spirit and scope thereof, of course, will be apparent to those skilled in the art. Accordingly, the foregoing is to be interpreted as illustrative only and the invention will be understood to be limited only by the scope of the appended claims.

What is claimed is:

1. A starch composition of improved enzyme convertibility which comprises bleached starch hydrolyzable in an aqueous medium by alpha-amylase at a temperature from about 160–195° F. and mixed therewith (1) an amount of calcium compound sufficient to activate and stabilize alpha-amylase to a pre-determined extent, and (2) a salt or combination of salts which yield sulfite and/or bisulfite ions upon solution in water, said salt or combination of salts being present in an amount sufficient to maintain the pH within the range of 6.0 to 7.5 in an aqueous paste of about 11% by weight of dry substance starch composition.

2. The starch composition of claim 1 wherein said calcium compound is selected from the group consisting of calcium hydroxide, calcium oxide and mixtures thereof.

3. The starch composition of claim 1 wherein said salt or combination of salts is selected from the group consisting of sodium sulfite, sodium bisulfite, sodium meta-bisulfite and mixtures thereof.

4. The starch composition of claim 1 wherein said amount of calcium compound is in the range of about 0.005% and 1.0% based on the dry weight of said bleached starch.

5. The starch composition of claim 4 wherein said salt or combination of salts is present in an amount in the range of about 0.05% and about 2.0% based on the dry weight of said bleached starch.

6. The starch composition of claim 5 wherein said salt or combination of salts is present in an amount in the range of 0.1% to 1.2% based on the dry weight of said bleached starch.

7. An aqueous, starch based composition of improved enzyme convertibility which comprises a mixture of water, an alpha-amylase preparation, and a starch based composition such that the concentration of said starch based composition in said water is in the range of from about 5% to about 40% dry substance by weight; said starch based composition comprising bleached starch hydrolyzable in an aqueous medium by alpha-amylase at a temperature in the range of 160–195° F., and mixed therewith (1) an amount of calcium compound sufficient to activate and stabilize alpha-amylase and (2) a salt or combination of salts which yield sulfite or bisulfite ions, and combinations thereof upon solution in water, said salt or combination of salts being present in an amount sufficient to maintain the pH within the range of 6.0 to 7.5 in an aqueous paste of about 11% by weight of dry substance starch based composition.

8. The composition of claim 7 wherein said calcium compound is selected from the group consisting of calcium hydroxide, calcium oxide and mixtures thereof.

9. The composition of claim 7 wherein said salt or combination of salts is selected from the group consisting of sodium sulfite, sodium bisulfite, sodium meta-bisulfite and mixtures thereof.

10. The composition of claim 7 wherein said amount of calcium compound is in the range of about 0.005% and 1.0% based on the dry weight of said bleached starch.

11. The composition of claim 10 wherein said salt or combination of salts is present in an amount in the range of about 0.05% and about 2.0% based on the dry weight of said bleached starch.

12. The composition of claim 11 wherein said salt or combination of salts is present in an amount in the range of 0.1% to 1.2% based on the dry weight of said bleached starch.

13. A process for hydrolyzing starch which comprises (A) combining water, an alpha-amylase preparation, and a starch composition so that the concentration of said starch composition in said water is in the range of from about 5% to about 40% dry substance by weight; said starch composition comprising bleached starch hydrolyzable in an aqueous medium by alpha-amylase, and mixed therewith (1) an amount of calcium compound sufficient to activate and stabilize alpha-amylase to a pre-determined extent, and (2) a salt or combination of salts which yield sulfite and/or bisulfite ions upon solution in water, said salt or combination of salts being present in an amount sufficient to maintain the pH within the range of 6.0 to 7.5 in an aqueous paste of about 11% by weight of dry substance starch composition when said aqueous paste is alpha-amylase converted at 175° F.; and (B) maintaining said mixture at a temperature in the range of from about 160° F. to about 195° F. for a time sufficient to cause said bleached starch to be hydrolyzed by the action of said alpha-amylase preparation.

14. The process of claim 13 wherein said calcium compound is selected from the group consisting of calcium hydroxide, calcium oxide and mixtures thereof.

15. The process of claim 13 wherein said salt or combination of salts is selected from the group consisting of sodium sulfite, sodium bisulfite, sodium meta-bisulfite and mixtures thereof.

16. The process of claim 13 wherein said amount of calcium compound is in the range of about 0.005% and 1.0% based on the dry weight of said bleached starch.

17. The process of claim 16 wherein said salt or combination of salts is present in an amount in the range of about 0.05% and about 2.0% based on the dry weight of said bleached starch.

18. The process of claim 17 wherein said salt or combination of salts is present in an amount in the range of 0.1% to 1.2% based on the dry weight of said bleached starch.

19. A dry, premix starch blend exhibiting improved alpha-amylase enzyme convertibility comprising bleached starch, calcium compound stabilizer and bisulfite ion producing salts, in which the bleached starch comprises at least 83% by weight of said premix blend, the calcium compound stabilizer comprises about .005 to 1.0% by weight based on the dry weight of the bleached starch, and the bisulfite ion producing salt comprises about 0.5% to 2.0% based on the dry weight of said bleached starch.

20. The premix starch blend of claim 19, in which the calcium compound stabilizer is selected from the group consisting of calcium oxide, calcium chloride, calcium hydroxide, calcium carbonate, calcium phosphate, calcium citrate, calcium lactate, calcium oxalate, and calcium tartrate, and mixtures thereof.

21. The premix starch blend of claim 19, in which the bisulfite ion producing salt is selected from the group consisting of sodium thiosulfate, potassium thiosulfate, ammonium bisulfite, sodium sulfite, sodium bisulfite, sodium meta-bisulfite, potassium sulfite, potassium bisulfite and calcium dihydrogen sulfite, and combinations thereof.

22. The premix formula of claim 19, in which the calcium compound stabilizer is calcium hydroxide and the bisulfite ion producing salt is a mixture of sodium metabisulfite and sodium sulfite.

References Cited
UNITED STATES PATENTS

| | | | |
|---|---|---|---|
| 3,557,091 | 1/1971 | Martin et al. | 195—31 |
| 3,524,798 | 8/1970 | Lloyd et al. | 195—68 |

A. LOUIS MONACELL, Primary Examiner

GARY M. NATH, Assistant Examiner

U.S. Cl. X.R.

127—29 R